(12) United States Patent
Lachapelle et al.

(10) Patent No.: US 10,015,385 B2
(45) Date of Patent: *Jul. 3, 2018

(54) ENHANCING VIDEO CONFERENCES

(71) Applicant: Google Inc., Mountain View, CA (US)

(72) Inventors: Serge Lachapelle, Vallentuna (SE); Jens Fredrik Oja, Stockholm (SE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,291

(22) Filed: May 18, 2017

(65) Prior Publication Data

US 2017/0257553 A1    Sep. 7, 2017

Related U.S. Application Data

(63) Continuation of application No. 14/941,290, filed on Nov. 13, 2015, now Pat. No. 9,661,208, which is a (Continued)

(51) Int. Cl.
*H04N 7/14* (2006.01)
*H04N 5/232* (2006.01)
(Continued)

(52) U.S. Cl.
CPC ..... *H04N 5/23206* (2013.01); *H04N 5/23222* (2013.01); *H04N 7/15* (2013.01);
(Continued)

(58) Field of Classification Search
CPC ............ G01S 5/0072; H04M 1/72572; H04M 2201/40; H04M 2250/52; H04M 3/4936;
(Continued)

(56) References Cited

U.S. PATENT DOCUMENTS 2,416,919 A * 3/1947 Goldsmith ............. G03B 33/16
  348/223.1
4,769,699 A * 9/1988 Gebauer .............. H04N 5/2228
  348/211.99
(Continued)

FOREIGN PATENT DOCUMENTS

JP    2012-138823    7/2012
KR    10-1998-0073270    11/1998

OTHER PUBLICATIONS

KIPO, Notice of Last Preliminary Rejection (with English translation) for Korean Patent Application No. 10-2016-7021204, dated Jul. 26, 2017, 9 pages.
(Continued)

*Primary Examiner* — Khai N Nguyen
(74) *Attorney, Agent, or Firm* — IP Spring

(57) ABSTRACT

Implementations generally relate to enhancing video conferences. In some implementations, a method includes determining one or more characteristics of a video stream provided by a first camera. The method further includes determining one or more functions of the first camera based on the one or more characteristics. The method further includes enabling a browser to control the one or more functions of the first camera, and wherein the browser is remote relative to the first camera.

20 Claims, 8 Drawing Sheets

Related U.S. Application Data continuation of application No. 14/171,086, filed on Feb. 3, 2014, now Pat. No. 9,215,411.

(51) Int. Cl.
*H04N 7/15* (2006.01)
*H04N 21/4227* (2011.01)
*H04N 21/4223* (2011.01)

(52) U.S. Cl.
CPC ......... *H04N 7/152* (2013.01); *H04N 21/4223* (2013.01); *H04N 21/4227* (2013.01)

(58) Field of Classification Search
CPC ............ H04M 3/5191; H04N 21/4223; H04N 21/4227; H04N 2007/145; H04N 5/272; H04N 5/23206; H04N 5/23222; H04N 7/14; H04N 7/141; H04N 7/142; H04N 7/144; H04N 7/147; H04N 7/148; H04N 7/15; H04N 7/152; H04N 7/155; H04N 7/157; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 379/265.03; 455/414.1, 566; 704/270
See application file for complete search history.

(56) References Cited

U.S. PATENT DOCUMENTS

| | | | | |
|---|---|---|---|---|
| 5,432,566 A * | 7/1995 | Tanaka | ..................... | H04N 5/57 348/645 |
| 6,111,607 A * | 8/2000 | Kameyama | ............. | G06T 5/009 348/255 |
| 6,182,116 B1 | 1/2001 | Namma et al. | | |
| 6,463,343 B1 | 10/2002 | Emens et al. | | |
| 6,564,380 B1 | 5/2003 | Murphy | | |
| 6,980,826 B2 | 12/2005 | Yamaguchi | | |
| 7,164,857 B2 | 1/2007 | Asai et al. | | |
| 7,321,384 B1 * | 1/2008 | Wu | ......................... | H04N 7/152 348/14.08 |
| 7,940,294 B2 * | 5/2011 | Wu | ......................... | H04N 7/152 348/14.08 |
| 8,559,936 B2 | 10/2013 | Faenger | | |
| 8,576,272 B2 * | 11/2013 | Wu | ......................... | H04N 7/152 348/14.08 |
| 8,964,298 B2 | 2/2015 | Haddick et al. | | |
| 2003/0043272 A1 | 3/2003 | Nagao et al. | | |
| 2003/0103075 A1 | 6/2003 | Rosselot | | |
| 2005/0002666 A1 | 1/2005 | Asai et al. | | |
| 2005/0134695 A1 | 6/2005 | Deshpande | | |
| 2005/0174473 A1 * | 8/2005 | Morgan | ................ | F21S 48/325 348/370 |
| 2006/0132859 A1 * | 6/2006 | Kalapathy | .............. | H04N 5/235 358/463 |
| 2007/0103543 A1 | 5/2007 | Anderson et al. | | |
| 2007/0279494 A1 * | 12/2007 | Aman | ................... | G01S 3/7864 348/169 |
| 2008/0068449 A1 * | 3/2008 | Wu | ......................... | H04N 7/152 348/14.09 |
| 2008/0180373 A1 * | 7/2008 | Mori | ..................... | G09G 3/3406 345/89 |
| 2009/0096883 A1 | 4/2009 | Ishii | | |
| 2009/0146982 A1 * | 6/2009 | Thielman | ................. | H04N 7/15 345/207 |
| 2009/0280863 A1 | 11/2009 | Shin et al. | | |
| 2009/0315972 A1 * | 12/2009 | Rensin | ............. | H04L 29/06027 348/14.02 |
| 2010/0315481 A1 * | 12/2010 | Wijngaarden | .......... | H04N 7/142 348/14.07 |
| 2011/0205333 A1 * | 8/2011 | Wu | ........................ | H04N 7/152 348/14.08 |
| 2011/0249084 A1 * | 10/2011 | Oertel | .................... | H04N 7/152 348/14.08 |
| 2012/0092439 A1 * | 4/2012 | Mackie | ................... | H04N 7/147 348/14.06 |
| 2012/0092444 A1 * | 4/2012 | Mackie | ............... | H04L 12/1822 348/14.12 |
| 2013/0109371 A1 * | 5/2013 | Brogan | ................. | G06F 1/1626 455/420 |
| 2013/0127980 A1 | 5/2013 | Haddick et al. | | |
| 2013/0201356 A1 | 8/2013 | Kennedy et al. | | |
| 2014/0028781 A1 * | 1/2014 | MacDonald | ........... | H04N 7/147 348/14.07 |
| 2015/0022674 A1 | 1/2015 | Blair et al. | | |
| 2015/0222854 A1 * | 8/2015 | Lachapelle | .............. | H04N 7/15 348/14.08 |

OTHER PUBLICATIONS

EPO, International Search Report and Written Opinion for International Patent Application No. PCT/US2015/012253, dated Apr. 2, 2015, 11 pages.
International Bureau of WIPO, International Preliminary Report on Patentability for International Patent Application No. PCT/US2015/012253, dated Aug. 9, 2016, 8 pages.
KIPO, Notice of Preliminary Rejection (with English translation) for Korean Patent Application No. 10-2016-7021204, dated Jan. 11, 2017, 8 pages.
Song, "Algorithms and Systems for Shared Access to a Robotic Streaming Video Camera", Proceedings of the ACM International Multimedia Conference and Exhibition, IEOR Department, University of California, Berkeley, CA 94720-1777, USA, 2003, pp. 652-653.
USPTO, First Action Interview, Pre-Interview Communication for U.S. Appl. No. 14/941,290, dated Aug. 12, 2016, 7 pages.
USPTO, First Action Interview, Office Action Summary for U.S. Appl. No. 14/941,290, dated Oct. 18, 2016, 9 pages.
USPTO, Notice of Allowance for U.S. Appl. No. 14/941,290, 5 pages, dated Jan. 25, 2017.
USPTO, First Action Interview, Pre-Interview Communication for U.S. Appl. No. 14/171,086, 5 pages, dated May 12, 2015.
USPTO, Final Office Action for U.S. Appl. No. 14/171,086, 16 pages, dated Jul. 21, 2015.
USPTO, Notice of Allowance for U.S. Appl. No. 14/171,086, 5 pages, dated Aug. 11, 2015.
KIPO, Notice of Final Rejection (with English translation) for Korean Patent Application No. 10-2016-7021204, dated Jan. 26, 2018, 7 pages.
KIPO, Second Notice of Final Rejection (with English translation) for Korean Patent Application No. 10-2016-7021204, Mar. 27, 2018, 7 pages.

* cited by examiner

400

400

500

600

700

ENHANCING VIDEO CONFERENCES

CROSS REFERENCE TO RELATED APPLICATIONS

This application is a continuation of U.S. patent application Ser. No. 14/941,290, titled ENHANCING VIDEO CONFERENCES and filed Nov. 13, 2015, which is a continuation of U.S. patent application Ser. No. 14/171,086, titled ENHANCING VIDEO CONFERENCES and filed Feb. 3, 2014 (now U.S. Pat. No. 9,215,411), the contents of both of which are incorporated herein by reference.

BACKGROUND

Video conferencing enables participants to share video and audio content with each other in real-time across geographically dispersed locations. A communication device at each location typically uses a video camera and microphone to send video and audio streams, and uses a video monitor and speaker to play received video and audio streams. Video conferencing involves digital compression of video and audio streams, which are transmitted in real-time across a network from one location to another. The communication devices perform the compressing and decompressing of the video and audio streams, and maintain the data linkage via the network.

SUMMARY

Implementations generally relate to enhancing video conferences. In some implementations, a method includes determining one or more characteristics of a video stream provided by a first camera. The method further includes determining one or more functions of the first camera based on the one or more characteristics. The method further includes enabling a browser to control the one or more functions of the first camera, and where the browser is remote relative to the first camera.

With further regard to the method, in some implementations, the one or more functions include controls for one or more of exposure, contrast, white balance, temperature, and aperture. In some implementations, the one or more functions include controls for one or more of capture rate and flicker. In some implementations, the one or more functions include controls for one or more of panning and zooming. In some implementations, the enabling of the browser to control the one or more functions includes providing one or more controls in the browser, where the one or more controls correspond to the one or more functions. In some implementations, the enabling of the browser to control the one or more functions includes analyzing one or more video characteristics associated with the video stream, and providing one or more controls in the browser based on the analyzing of the one or more video characteristics, where the one or more controls correspond to the one or more functions. In some implementations, the enabling of the browser to control the one or more functions includes providing one or more controls in the browser, where the one or more controls correspond to the one or more functions, and where the one or more controls correspond to one or more settings associated with the one or more functions. In some implementations, the first camera is associated with a first user, and the browser is associated with a second user.

In some implementations, a method includes determining one or more characteristics of a video stream provided by a first camera. The method further includes determining one or more functions of the first camera based on the one or more characteristics, where the one or more functions include controls for one or more of capture rate, flicker, white balance, exposure, contrast, temperature, and aperture. The method further includes enabling a browser to control the one or more functions of the first camera, where the browser is remote relative to the first camera, where the enabling of the browser to control the one or more functions includes providing one or more controls in the browser, and where the one or more controls correspond to the one or more functions.

With further regard to the method, in some implementations, the one or more functions include controls for one or more of panning and zooming. In some implementations, the enabling of the browser to control the one or more functions includes analyzing one or more video characteristics associated with the video stream, and providing one or more controls in the browser based on the analyzing of the one or more video characteristics, where the one or more controls correspond to the one or more functions. In some implementations, the enabling of the browser to control the one or more functions includes providing one or more controls in the browser, where the one or more controls correspond to the one or more functions, and where the one or more controls correspond to one or more settings associated with the one or more functions. In some implementations, the enabling of the browser to control the one or more functions includes overriding one or more settings associated with the one or more functions.

In some implementations, a system includes one or more processors, and logic encoded in one or more tangible media for execution by the one or more processors. When executed, the logic is operable to perform operations including: determining one or more characteristics of a video stream provided by a first camera; determining one or more functions of the first camera based on the one or more characteristics; and enabling a browser to control the one or more functions of the first camera, and where the browser is remote relative to the first camera.

With further regard to the system, in some implementations, the one or more functions include controls for one or more of exposure, contrast, white balance, temperature, and aperture. In some implementations, the one or more functions include controls for one or more of capture rate and flicker. In some implementations, the one or more functions include controls for one or more of panning and zooming. In some implementations, to enable the browser to control the one or more functions, the logic when executed is further operable to perform operations including providing one or more controls in the browser, and where the one or more controls correspond to the one or more functions. In some implementations, to enable the browser to control the one or more functions, the logic when executed is further operable to perform operations including analyzing one or more video characteristics associated with the video stream, and providing one or more controls in the browser based on the analyzing of the one or more video characteristics, where the one or more controls correspond to the one or more functions. In some implementations, to enable the browser to control the one or more functions, the logic when executed is further operable to perform operations including providing one or more controls in the browser, where the one or more controls correspond to the one or more functions, and where the one or more controls correspond to one or more settings associated with the one or more functions.

DETAILED DESCRIPTION

Implementations described herein enhance video conferences. In various implementations, a system determines one or more functions of a first camera providing a video stream, where the first camera is associated with a first user. In some implementations, the functions may include controls for one or more of capture rate, flicker, white balance, exposure, contrast, temperature, aperture, panning, and zooming.

The system then enables a browser to control the one or more functions of the first camera, where the browser is associated with a second user, and where the browser is remote relative to the first camera. In some implementations, the enabling of the browser to control the one or more functions includes analyzing one or more video characteristics associated with the video stream, and providing one or more controls in the browser based on the analyzing of the one or more video characteristics, where the one or more controls correspond to the one or more functions, and where the one or more controls correspond to one or more settings associated with the one or more functions. In some implementations, the enabling of the browser to control the one or more functions includes overriding the one or more settings associated with the one or more functions.

Figure 1:
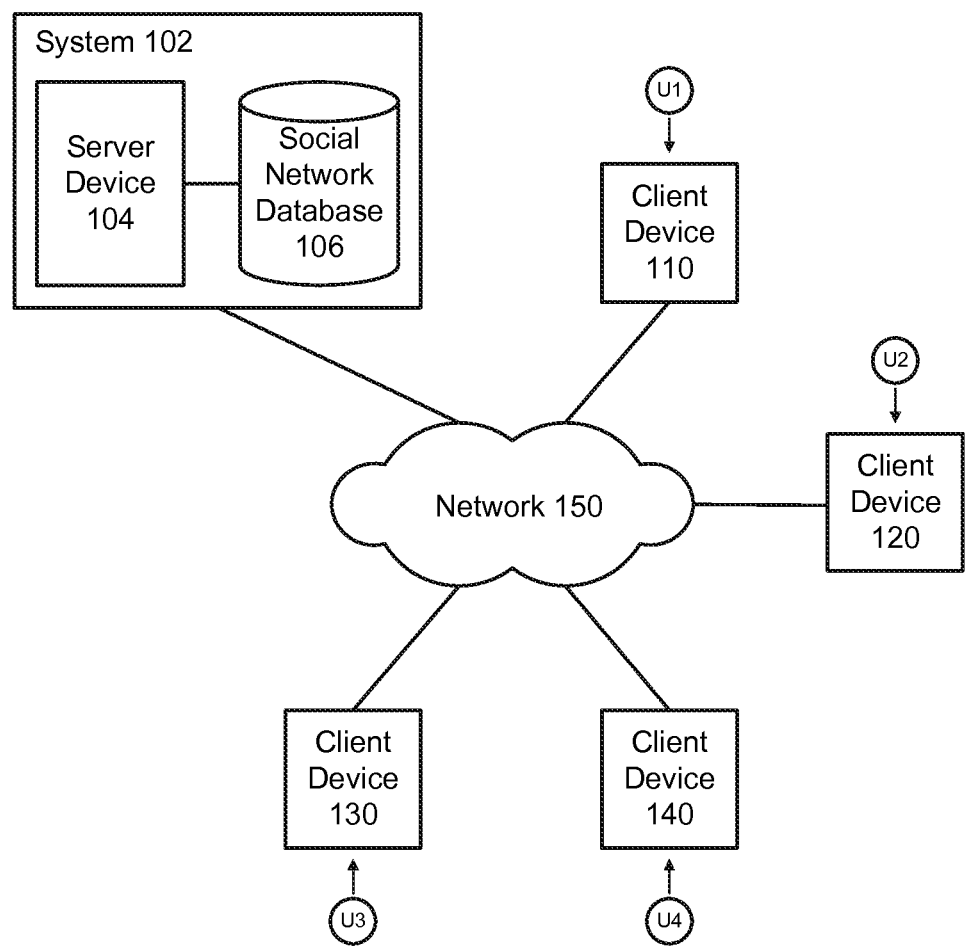
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In the various implementations described herein, processor of system 102 causes the elements described herein (e.g., browser control buttons, etc.) to be displayed in a user interface on one or more display screens.

In various implementations, system 102 may utilize a recognition algorithm to enhancing a video conference. Example implementations of recognition algorithms are described in more detail below.

Figure 2:
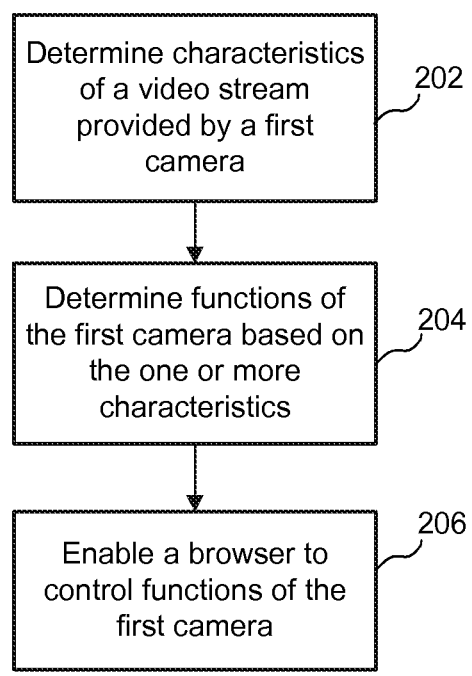
FIG. 2 illustrates an example simplified flow diagram for enhancing video conferences, according to some implementations.

FIG. 2 illustrates an example simplified flow diagram for enhancing video conferences, according to some implementations. Referring to both FIGS. 1 and 2, a method is initiated in block 202, where system 102 determines one or more characteristics of a video stream provided by a first camera. In various implementations, the one or more characteristics may include basic aspects of a video. For example, system 102 may determine values for exposure, exposure time, brightness, contrast, saturation, sharpness, white balance, temperature (e.g., white balance temperature), aperture, etc.

In various implementations, the one or more characteristics may include more advanced aspects of a video. For example, system 102 may determine values for power line frequency (anti-flicker), flicker, capture rate, backlight compensation, focus, etc.

In various implementations, system 102 detects behavior in the video stream, and detects where any one or more of these characteristics are not optimal. For example, in some implementations, system 102 may determine if the color saturation the video stream is off, if there is flicker in the video stream, etc. In the flicker example, electricity in some countries may run at one frequency (e.g, 50 hertz (Hz)) but a given camera may be set to another frequency (e.g., 60 Hz), which may cause flicker. System 102 detects such flicker characteristics. As described below, system 102 may provide a user with controls to remotely modify the frequency settings of the camera in order to correct for flicker and/or system 102 may automatically modify such settings to correct for flicker.

In various implementations, system 102 may determine the one or more characteristics of the video stream based on image processing at any suitable location. For example, in some implementations, system 102 may perform the processing local to system 102 or at any other server accessible to system 102. In some implementations, system 102 may cause some image processing to occur at any suitable browser. For example, if the images are processes at any one or more of the browsers associated with the video conference. System 102 may access such data from any one or more of such browsers and then analyze the data in order to determined the characteristics of the video stream.

In some implementations, the one or more characteristics may include features and/or elements in a video. For example, system 102 may detect faces in the video, whether faces as objects or particular faces associated with particular users. In some implementations, system 102 may detect skin tone of particular faces on the video.

The particular characteristics and particular combination of characteristics will vary depending on the specific implementation. System 102 may use any suitable recognition algorithm to detect the characteristics described herein. Example implementations of recognition algorithms are described in more detail below.

In block 204, system 102 determines one or more functions of the first camera based on the one or more characteristics. For example, in various implementations, system 102 determines the functions by checking the application programming interface (API) functions associated with each camera providing a video stream in the video conference.

In some implementations, system 102 determines the functions by checking the low-level API functions associated with each camera providing a video stream in the video conference. Such low-level API functions enable system 102 to control fine-grained settings, including presets, native events, etc.

In various implementations, the one or more functions may include controls for basic aspects of a video. For example, system 102 may determine available controls for exposure, exposure time, brightness, contrast, saturation, sharpness, white balance, temperature (e.g., white balance temperature), aperture, etc. In various implementations, the one or more functions may include controls for more advanced aspects of a video. For example, system 102 may determine values for power line frequency (anti-flicker), flicker, capture rate, backlight compensation, focus, etc. In the flicker example described above, system 102 may determine if any settings associated with flicker (e.g., anti-flicker) are available for modification via the low-level API.

In various implementations, the one or more functions may include one or more controls for video effects. For example, in some implementations, system 102 may determine functions for panning, zooming, tilt, etc.

In various implementations, system 102 determines the functions described herein based on the determined characteristics (e.g., from block 202). In some implementations, system 102 may specifically determine a particular function based on a particular characteristic.

For example, in one scenario, system 102 may detect a particular skin tone in the video stream. That particular determination may trigger system 102 to determine from the low-level API functions if panning, zooming, tilt, etc. are available. Similarly, system 102 may determine such low-level API functions (e.g., panning, zooming, tilt, etc.) based on detection of objects such as faces, etc.

In block 206, system 102 enables a browser to control the one or more functions of the first camera, where the browser is remote relative to the first camera. In various implementations, the first camera is associated with a first user, and the browser is associated with a second user. In various implementations described herein, control of camera setting may be performed in real-time or based on stored settings in a database. In either case, control data may be passed to the browser associated with the camera being controlled via any suitable data connection protocol such as transfer protocol (HTTP), Web Real-Time Communication (WebRTC), data channel API, etc.

As described in various implementations herein, the control of functions of the first camera may be performed by user-provided manipulation of controls, by system 102 automatically manipulating controls, or by preset settings stored in a database. System 102 may then cause appropriate control signals to be pushed to the browser and/or other software associated with a given camera. The browser or software may then in turn push the control signals to the camera for direct control of the camera hardware or for control over software that modifies the video stream.

Figure 3:
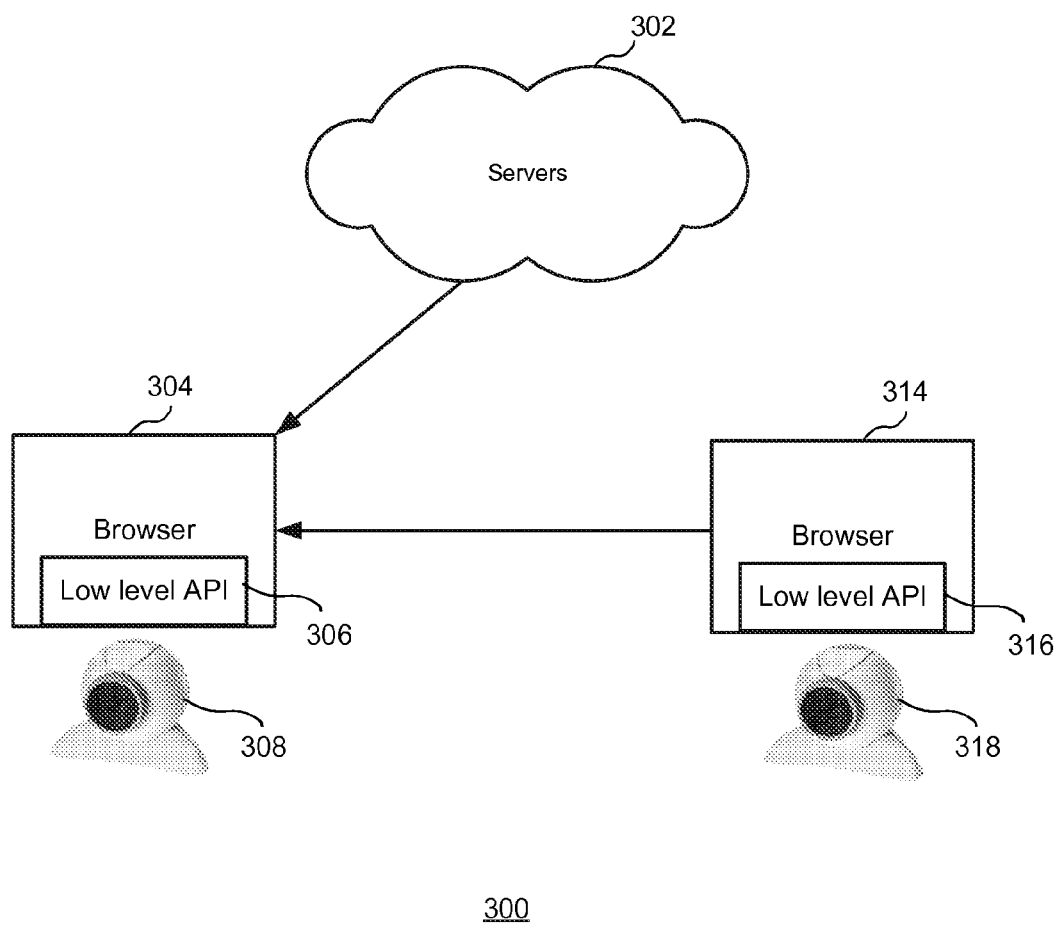
FIG. 3 illustrates an example simplified environment for enhancing video conferences, according to some implementations.

FIG. 3 illustrates an example simplified environment 300 for enhancing video conferences, according to some implementations. As shown, environment 300 includes servers 302, a first browser 304 associated with a low-level API 306, a first camera 308. Environment 300 also includes a second browser 314 associated with a low-level API 316, and a second camera 318. In various implementations, system 102 of FIG. 1 may be among servers 302.

In various implementations, first camera 308 is associated with a first user. For ease of illustration, various example implementations are described herein in the context of first camera 308. These implementations also apply each camera involved in a multi-user video conference. For example, these implementations may apply to second camera 318 associated with a second user. In such an example, the browser controlling second camera 318 may be browser 304, or any browser that is remote to second camera 318, where browser 304 is associated with the first user. The various implementations described herein may apply to any type of browser. Furthermore, while implementations are described herein in the contact of browsers, these implementations also apply to other softer applications that may be use for a video conference.

Referring to FIGS. 1 and 3, in various implementations, to enable browser 314 to control one or more functions of remote camera 308, system 102 provides one or more controls in browser 314, where the one or more controls correspond to the one or more functions. In various implementations, system 102 causes such controls to be displayed in browser 314 in real-time as system 102 determines the available functions of low-level API 306. In other words, the controls that where not previously displayed in browser 314 become displayed after determining the available functions. For ease of illustration, controls are described in the context of browser 314. In various implementations, system 102 may cause such controls to be displayed in other browsers (not shown) that are associated with other users in the particular video conference. Such other browsers may also include browser 304.

Figure 4A:
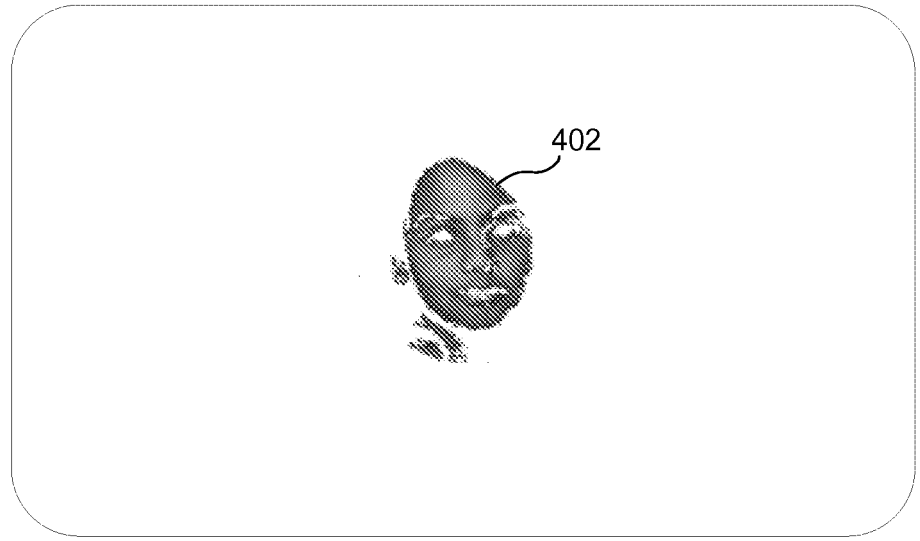
FIG. 4A illustrates an example video stream, according to some implementations.

FIG. 4A illustrates an example video stream 400, according to some implementations. As shown, video stream 400 displays a face 402. In this particular example implementation, video stream may represent a video stream displayed in browser 314, which may display multiple video streams.

In various implementations, system 102 may detect face 402 using an appropriate facial recognition algorithm as described herein. System 102 may detect face 402 by detecting the skin tone of particular faces on the video. For ease of illustration, one face 402 is shown. In other example implementations, there may be multiple faces in a given video stream that system 102 detects.

In various implementations, to enable browser 314 to control the one or more functions, system 102 analyzes one or more video characteristics associated with the video stream provided by camera 308 (as described in block 202 of FIG. 2). In this particular example, the characteristics include a face and/or skin tone. Other characters are possible such as the other characteristics described herein. System 102 then provides one or more controls in browser 314 based on the analyzing of the video characteristics. As indicated herein, the one or more controls correspond to the one or more determined functions. In various implementations, the one or more controls correspond to the one or more settings associated with the one or more functions. In various implementations, to enable browser 314 to control the one or more functions, system 102 overrides one or more settings of camera 308 associated with the one or more functions.

Figure 4B:
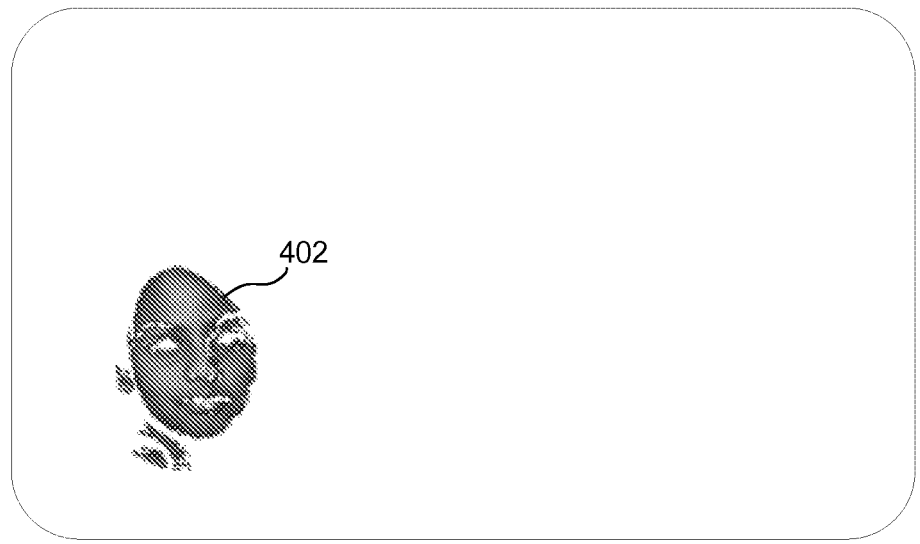
FIG. 4B illustrates example video stream, according to some implementations.

FIG. 4B illustrates example video stream 400, according to some implementations. Similar to FIG. 4A, FIG. 4B shows video stream 400 and face 402. Comparing FIGS. 4A and 4B, the same user from FIG. 4A may use the controls in browser 314 provided by system 102 to pan within video stream 400 (provided by camera 308). For example, referring to FIG. 4A, face 402 is positioned in the middle of video stream 400. Implementations may control camera 308 using any suitable control capabilities (e.g., universal serial bus video class (UCV), etc.). Referring to FIG. 4B, face 402 has been moved or panned to the lower left of video stream 400 by controls in browser 318.

In some implementations, where system 102 detects multiple faces in a given video stream. System 102 may, based on such detection, further detect available functions such as pan, tilt, and/or zoom. System 102 may then provide controls to manipulate the camera capturing the video stream to pan, tilt, and/or zoom in order to focus on a single participant in the same room as other participants. In some implementations, system 102 may automatically manipulate the controls to cause the camera to pan, tilt, and/or zoom to focus on a single participant based on facial recognition. In some implementations, system 102 may also enable a remote user to manipulate the controls to cause the camera to pan, tilt, and/or zoom to focus on a single participant.

In some implementations, system 102 may use other suitable recognition algorithms to pan, tilt and/or zoom to focus on a particular participant. For example, system 102 may use a recognition algorithm to detect lip movement in order to determine which participant to potentially focus on. In some implementations, through the use of microphones and/or sound analysis, system 102 may enable controls for panning, tilting and zooming on a particular participant in a room. For example, system 102 may enable controls to move the camera towards the loudest signal. In some implementations, system 102 may triangulate information using multiple microphones. Example controls are described in more detail below in connection with FIGS. 5, 6, and 7.

As describe herein, system 102 may automatically apply changes to camera settings based on the determined characteristics. For example, based on the detection of a face whether by facial recognition and/or by detection of skin tone, system 102 may cause the video stream to zoom in and/or track the head of the person talking. Such zooming and/or tracking may be performed using hardware control of the camera and/or software control of the video stream.

In some implementations, system 102 may enable controls to zoom in on a given object or element in the video stream. For example, in some implementations, system 102 may detect a given face such as face 402 and then provide controls in browser 314 to focus/zoom in on face 402. In some implementations, system 102 may cause camera 308 to record in a high-resolution mode and then enable zoom controls to zoom in on face 402. In some implementations, system 102 may enable a user (e.g., the user associated with browser 318) to apply a rectangle to indicate where to zoom. In some implementations, where the display is a touchscreen, system 102 may enable the user to zoom in and out using the user's fingers, as well as to perform other functions such as panning, tilting, etc.

In various implementations, changes in settings may modify a video stream using hardware, software, or combination thereof. In one implementation, if hardware is being controlled (e.g., hardware of camera 308), changes may be viewed on all browsers associated with the video conference. In some implementations, if software is being controlled (e.g., at any given browser), changes may be viewed at any one or more browsers (e.g., at browser 314) and need not be viewed on all browsers.

In some implementations, system 102 may enable the user who owns the camera being remotely manipulated to place some limitations on the control. For example, system 102 may enable that user to view how the video stream is being changed and/or limit how the video is being changed (e.g., placing some limits on panning, zooming, etc.).

As indicated above, in some implementations, system 102 may store one or more settings (e.g., favorite settings) for a given user in a database. System 102 may later automatically apply such settings whenever the user associated with the settings enters a video conference. In some implementations, if the settings for a given user is applied and that user then leaves the video conference, the settings may return to default settings.

Figure 5:
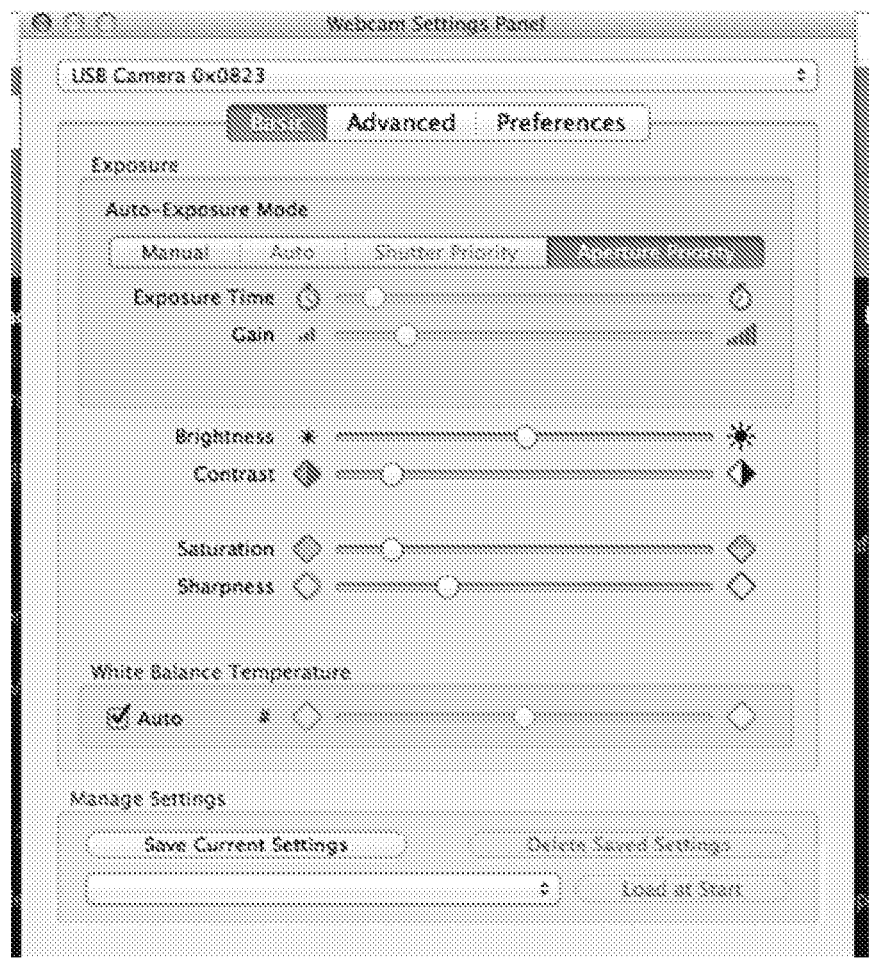
FIG. 5 illustrates an example simplified user interface, according to some implementations.

FIG. 5 illustrates an example simplified user interface 500, according to some implementations. As shown, user interface 500 includes various controls and settings for basic functions associated with a video stream. For example, user interface 500 includes controls for exposure, auto-exposure, exposure time, gain, brightness, contrast, saturation, sharpness, white balance, temperature (e.g., white balance temperature), etc. Other controls and settings for basic functions are possible, depending on the particular implementation.

Figure 6:
FIG. 6 illustrates an example simplified user interface, according to some implementations.

FIG. 6 illustrates an example simplified user interface 600, according to some implementations. As shown, user interface 600 includes various controls and settings for more advanced functions associated with a video stream. For example, user interface 600 includes controls for power line frequency (anti-flicker), flicker, backlight compensation, focus, zoom, pan, tilt, etc. Other controls and settings for more advanced functions that are not shown in this example are possible, depending on the particular implementation. In the flicker example described above, after system 102 determines that there are settings associated with flicker, system 102 may provide flicker compensation controls in the browser as shown in user interface 600.

Figure 7:
FIG. 7 illustrates an example simplified user interface, according to some implementations.

FIG. 7 illustrates an example simplified user interface 700, according to some implementations. As shown, user interface 700 includes various controls for more preferences associated with a video stream. For example, user interface 700 includes controls and settings for preferences associated with read settings from a camera and write settings to a camera. Other controls and settings for preferences that are not shown in this example are possible, depending on the particular implementation.

As indicated above, while some implementations are described herein in the context of system 102 providing controls for a remote user to manipulate, system 102 may apply such change automatically without require action from a user. For example, system 102 may automatically detect flicker and then automatically apply anti-flicker changes to a camera such as camera 308.

While some implementations are described herein in the context of improving suboptimal characteristics in a video stream, these implementations and others may also apply to other characteristics for entertainment and/or artistic purposes. For example, system 102 may enable a user to remotely modify the colors of a video stream (e.g., color to black and white, etc.).

In some implementations, system 102 may enable a given user to modify the frame rate of a video stream. For example, if the frame rate is 15 frames per second instead of a desired 30, system 102 may detect such a low frame rate and based on such detection provide controls to change the frame rate. Such control may be useful, for example, to a user who uses sign language. Such a user may prefer to have a higher frame rate even at the expense of video quality.

Implementations described herein provide various benefits. For example, implementations enable each user (e.g., video conference participant) to optimize various characteristics of video streams from his or her browser. Implementations also enable each user to optimize various characteristics of video streams that are typically managed at a particular video camera. Implementations described herein also increase overall engagement among users in a social networking environment.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Figure 8:
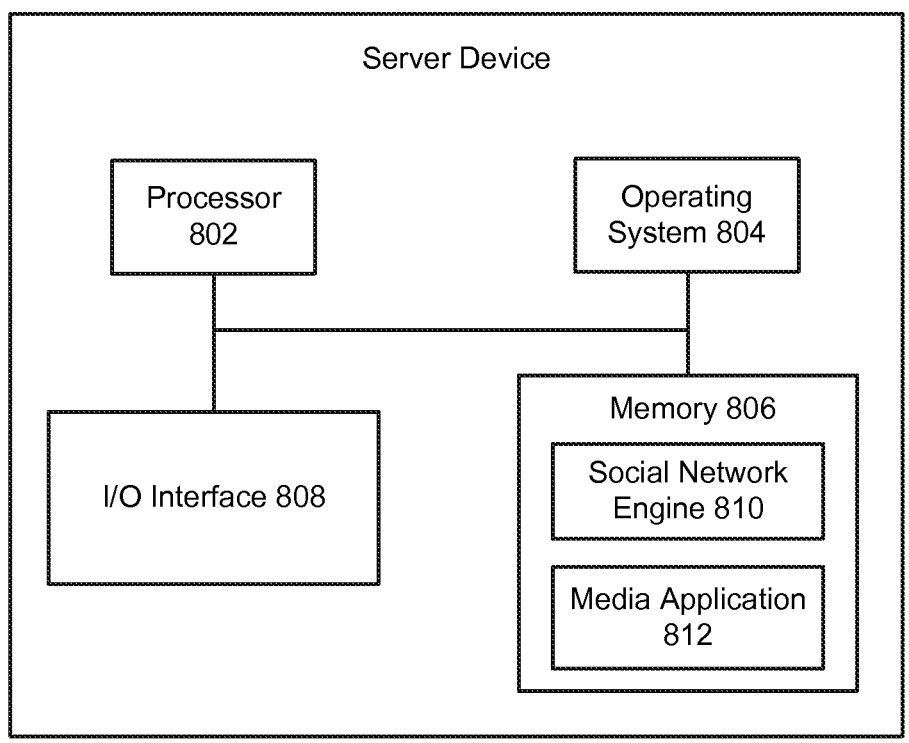
FIG. 8 illustrates a block diagram of an example server device, which may be used to implement the implementations described herein.

FIG. 8 illustrates a block diagram of an example server device 800, which may be used to implement the implementations described herein. For example, server device 800 may be used to implement server device 104 of FIG. 1, as well as to perform the method implementations described herein. In some implementations, server device 800 includes a processor 802, an operating system 804, a memory 806, and an input/output (I/O) interface 808. Server device 800 also includes a social network engine 810 and a media application 812, which may be stored in memory 806 or on any other suitable storage location or computer-readable medium. Media application 812 provides instructions that enable processor 802 to perform the functions described herein and other functions.

For ease of illustration, FIG. 8 shows one block for each of processor 802, operating system 804, memory 806, I/O interface 808, social network engine 810, and media application 812. These blocks 802, 804, 806, 808, 810, and 812 may represent multiple processors, operating systems, memories, I/O interfaces, social network engines, and media applications. In other implementations, server device 800 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A computer-implemented method to control a camera in a video conference, the method comprising:

determining one or more characteristics of a video stream provided by the camera that match one or more predefined stream characteristics, wherein the camera is configured to provide the video stream associated with a first device participating in the video conference;

determining, by a software application executing on at least one hardware processor of a second device in communication with the camera over a communication network, one or more functions of the camera provided by an application programming interface associated with the camera;

determining one or more controls that are associated with the one or more functions, wherein the one or more controls are determined based on the one or more characteristics of the video stream; and causing the one or more controls to be displayed in a user interface of the software application on a display of the second device, wherein the one or more controls, when activated by a user of the second device, cause one or more commands to be sent to the camera to use at least one of the one or more functions of the camera to modify at least one of the one or more characteristics of the video stream.

2. The computer-implemented method of claim 1 wherein determining the one or more characteristics of the video stream includes detecting flicker in the video stream.

3. The computer-implemented method of claim 1 wherein determining the one or more characteristics of the video stream includes determining color saturation in the video stream.

4. The computer-implemented method of claim 1 further comprising automatically adjusting at least one of the one or more controls to use the at least one of the one or more functions of the camera such that, after the adjusting, the one or more characteristics of the video stream do not match the one or more predefined stream characteristics.

5. The computer-implemented method of claim 4 wherein automatically adjusting the at least one of the one or more controls to modify the at least one of the one or more functions of the camera includes automatically adjusting the at least one of the one or more controls based on stored settings associated with a second user of the second device.

6. The computer-implemented method of claim 5 further comprising:
  determining that the second device has exited the video conference; and
  in response to determining that the second device has exited the video conference, resetting the at least one of the one or more controls such that the one or more characteristics of the video stream match the one or more predefined stream characteristics.

7. The computer-implemented method of claim 1 wherein determining the one or more functions of the camera is performed in response to determining the one or more characteristics of the video stream match the one or more predefined stream characteristics.

8. The computer-implemented method of claim 1 wherein the camera is configured to provide the video stream associated with a first user participating in the video conference.

9. The computer-implemented method of claim 1 wherein the at least one of the one or more controls is not displayed in the user interface prior to the determining the one or more characteristics of the video stream match the one or more predefined stream characteristics.

10. The computer-implemented method of claim 1 further comprising:
  receiving user input for at least one of the one or more controls;
  generating, using the application programming interface, the one or more commands configured to modify at least one of the one or more functions of the camera based on the adjustment of the at least one of the one or more controls; and
  sending the one or more commands to the camera.

11. A system comprising:
  a storage device;
  a display device; and
  one or more hardware processors configured to access the storage device and configured to perform operations comprising:
  determining one or more characteristics of a video stream provided by a camera that match one or more predefined stream characteristics, wherein the camera is configured to provide the video stream associated with a first device participating in a video conference;
  determining, by a software application executing on at least one hardware processor of the one or more hardware processors, one or more functions of the camera, wherein the camera is in communication with the at least one hardware processor over a communication network;
  determining one or more controls that are associated with the one or more functions, wherein the one or more controls are determined based on the one or more characteristics of the video stream;
  causing the one or more controls to be displayed in a user interface of the software application on the display device;
  receiving an activation of at least one of the one or more controls;
  generating, using the software application, the one or more commands configured to use at least one of the one or more functions of the camera based on the activation of the at least one of the one or more controls to modify at least one of the one or more characteristics of the video stream; and
  sending the one or more commands to the camera.

12. The system of claim 11 wherein the operation of determining the one or more characteristics of the video stream includes detecting flicker in the video stream.

13. The system of claim 11 wherein the operation of determining the one or more characteristics of the video stream includes determining color saturation in the video stream.

14. The system of claim 11 wherein the one or more hardware processors are further configured to perform an operation of automatically adjusting at least one of the one or more controls to use the at least one of the one or more functions of the camera such that, after the adjusting, the one or more characteristics of the video stream do not match the one or more predefined stream characteristics.

15. The system of claim 14 wherein the operation of automatically adjusting the at least one of the one or more controls to modify the at least one of the one or more functions of the camera includes automatically adjusting the at least one of the one or more controls based on stored settings associated with a second user of the second device, and wherein the one or more hardware processors are further configured to perform operations comprising:
  determining that the second device has exited the video conference; and
  in response to determining that the second device has exited the video conference, resetting the at least one of the one or more controls such that the one or more characteristics of the video stream match the one or more predefined stream characteristics.

16. The system of claim 11 wherein determining the one or more functions of the camera is performed in response to determining the one or more characteristics of the video stream match the one or more predefined stream characteristics.

17. The system of claim 11 wherein the camera is configured to provide the video stream associated with a first user participating in the video conference, and wherein the software application is associated with a second user participating in the video conference.

18. The system of claim 11 wherein the at least one of the one or more controls is not displayed in the user interface prior to the determining the one or more characteristics of the video stream match the one or more predefined stream characteristics.

19. A non-transitory computer-readable medium storing software instructions that, when executed by at least one processor, cause the at least one processor to control a camera in a video conference by performing operations comprising:
  determining one or more characteristics of a video stream provided by the camera that do not match one or more predefined stream characteristics, wherein the camera is configured to provide the video stream associated with a first device participating in the video conference;
  determining, by a software application executing on at least one hardware processor of a second device in communication with the camera over a communication network, one or more functions provided by an application programming interface for the camera;
  determining one or more controls that are associated with the one or more functions, wherein the one or more controls are determined based on the one or more characteristics; and
  causing the one or more controls to be displayed in a user interface of the software application on a display of the second device, wherein the one or more controls, when activated by a user of the second device, cause one or more commands to be sent to the camera to use at least one of the one or more functions of the camera to modify at least one of the one or more characteristics of the video stream.

20. The non-transitory computer-readable medium of claim 19 wherein the one or more characteristics of the video stream include at least one of:
   flicker in the video stream; and
   color saturation in the video stream.

* * * * *